United States Patent [19]

Andoh

[11] 3,770,906

[45] Nov. 6, 1973

[54] FLUTTER RESISTING MAGNETIC RECORDING AND REPRODUCING APPARATUS

[75] Inventor: Akira Andoh, Kawasaki, Japan

[73] Assignee: Ricoh Co., Ltd., Tokyo, Japan

[22] Filed: Feb. 28, 1972

[21] Appl. No.: 229,953

[30] Foreign Application Priority Data

Mar. 11, 1971 Japan ............................... 46/13221

[52] U.S. Cl. ........................................ 179/100.2 C

[51] Int. Cl.... G11b 5/48, G11b 15/30, G11b 15/28

[58] Field of Search ............................ 179/100.2 C

[56] References Cited

UNITED STATES PATENTS

| | | | |
|---|---|---|---|
| 2,735,900 | 2/1956 | Wohlrab et al. | 179/100.2 C |
| 3,443,039 | 5/1969 | Bygdnes | 179/100.2 C |

*Primary Examiner*—Bernard Konick
*Assistant Examiner*—Robert S. Tupper
*Attorney*—Henry T. Burke et al.

[57] ABSTRACT

Apparatus comprising a rotatable follower drum composed of two hollow cylindrical drum members axially spaced from each other along a common axis to form an axial gap in which at least one magnetic head is disposed such that a tip of the magnetic head projects slightly radially outwardly of the outer circumferential surface of the follower drum. A magnetic tape is brought into pressing engagement with a portion of the outer circumferential surface of the follower drum by a drive roller and a pinch roller so that magnetic recording or reproduction can be carried out by the magnetic head. The apparatus assures smooth motion of the tape past the head, and helps eliminate flutter and tape jitter and vibration.

7 Claims, 4 Drawing Figures

FLUTTER RESISTING MAGNETIC RECORDING AND REPRODUCING APPARATUS

BACKGROUND OF THE INVENTION

This invention relates to magnetic recording and reproducing apparatus, and, more particularly, it is concerned with magnetic recording and reproducing apparatus of the type including video tape recorders in which magnetic tape moves at high speed.

If the frequency of recording and reproduction is increased and the rate of movement of magnetic tape is increased in magnetic recording and reproducing apparatus, the flutter of the tape itself in addition to the wow flutter component generally considered to occur should be taken into consideration.

In order to eliminate such flutter, it has hitherto been customary to employ a double capstan system as shown in FIG. 1 or a double pinch roller system as shown in FIG. 2.

The double capstan system shown in FIG. 1 comprises two capstans 1 and 2 and two pinch rollers 3 and 4, with a head 5 being interposed between the two capstans 1 and 2. In this system, portions of a magnetic tape 6 disposed between capstan 1 and head 5 and capstan 2 and head 5 move in air.

In the double pinch roller system shown in FIG. 2, two pinch rollers 8 and 9 press against a capstan 7, and a magnetic tape 10 moved forwardly by capstan 7 and pinch roller 8 is turned back by a guide roller 11 and moved rearwardly by capstan 7 and pinch roller 9. Magnetic heads 12 and 13 press against a portion of the magnetic tape 10 disposed between pinch roller 8 and guide roller 11 and a portion thereof disposed between pinch roller 9 and guide roller 11 respectively. In the latter system too, magnetic tape 10 moves in air when recording and reproduction is performed.

The movement of magnetic tape in air which takes place in conventional systems is not desirable for various reasons. For example, such movement causes the magnetic tape to vibrate because of variations in the tensile force exerted thereon and the expansion and contraction of the tape itself. In addition, the tape movement is unstable, and jitter may occur thereby adversely affecting the recording and playback of information.

To obviate these diadvantages, it is necessary to provide means for moving magnetic tape smoothly in a stable manner when recording and playback are carried out and at the same time to eliminate vibrations of the tape itself.

SUMMARY OF THE INVENTION

This invention has as its object the provision of magnetic recording and reproducing apparatus wherein detaching of the magnetic tape from the magnetic head during movement and jitter in tape movement can be eliminated.

According to this invention, there are provided magnetic recording and reproducing apparatus wherein a follower drum having flywheel effect is formed in two pieces, at least one magnetic head is mounted in a gap between two drum members so that a tip of the head extends slightly radially outwardly of the outer circumferential surface of the follower drum, and a drive roller and a pinch roller pressing against the outer circumferential surface of the follower drum are disposed on opposite sides of the head tip, whereby the portion of a magnetic tape engaged by the magnetic head is pressed against the outer circumferential surface of the follower drum and moves with the drum.

By this arrangement it is possible to guide and move the magnetic tape at a rate equal to the peripheral velocity of the follower drum while the tape is maintained in intimate contact with the outer circumferential surface of the drum, thereby preventing vibration of magnetic tape at and in the vicinity of the magnetic head during recording and reproduction. The fact that the magnetic tape moves at a rate equal to the peripheral velocity of the follower drum while being maintained in intimate contact with the outer circumferential surface thereof makes it possible to eliminate or minimize jitter of the portion of the magnetic tape between the drive roller and the pinch roller.

DESCRIPTION OF A PREFERRED EMBODIMENT OF THE INVENTION

Figure 1:
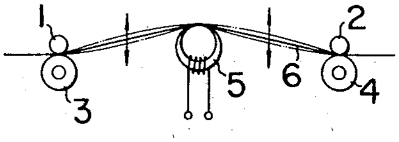
FIG. 1 PRIOR ART
FIG. 1 and FIG. 2 are schematic plan views of conventional systems for moving magnetic tape in magnetic recording and reproducing apparatus of the prior art.
Figure 2:
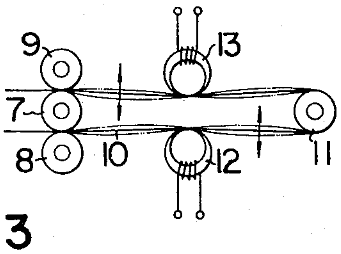
FIG. 2 PRIOR ART
Figure 3:
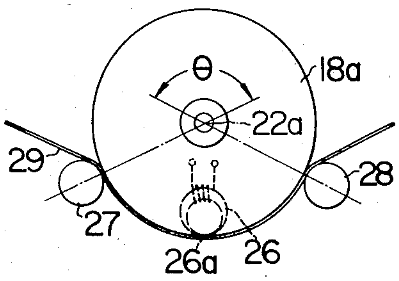
FIG. 3 is a plan view showing the arrangement of the follower drum, drive roller and pinch roller for moving magnetic tape without jitter in magnetic recording and reproducing apparatus comprising one embodiment of this invention.
Figure 4:
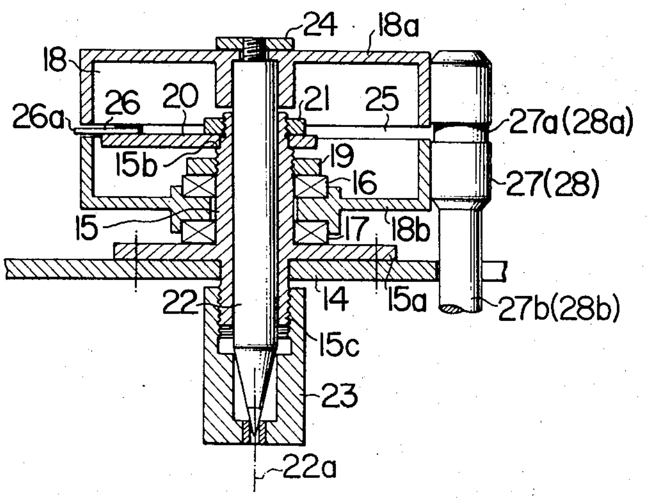
FIG. 4 is a vertical sectional side view, on an enlarged scale, of FIG. 3.

One embodiment of this invention will be described with reference to the drawings. In FIG. 4, a lower drum member **18*b* is rotatably supported through bearings 16 and 17 by a flange 15*a* of a sleeve 15 secured to a base plate 14. Axial movement of lower drum member 18*b* is precluded by a nut 19 threadably fitted over an upper portion of sleeve 15**.

Fitted over an offset portion **15*b* in an upper portion of sleeve 15 is a head supporter 20 which is secured fixedly to sleeve 15 by a nut 21. Extending rotatably through sleeve 15 is a shaft 22 which is journalled at its lower end by a bearing 23 threadably fitted over a lower end portion 15*c* of sleeve 15 extending through base plate 14. An upper drum member 18*a* is secured by a nut 24 to a suitably threaded upper end portion of shaft 22**.

A follower drum 18 composed of two hollow cylindrical drum members **18*a* and 18*b* which are coaxial and axially spaced from each other by an axial gap 25 is supported for rotation about the center axis 22*a* of shaft 22**.

A magnetic head 26 supported by supporter 20 is disposed in a gap 25 between upper drum member **18*a* and lower drum member 18*b* and has a tip 26*b* which projects radially outwardly from gap 25. The dimension of gap 25 may be varied by adjusting the degree of threadable fitting of bearing 23 over sleeve 15. An amplifier for magnetic head 26 may be built in follower drum 18**.

A drive roller 27 and a pinch roller 28 are adapted to press against the outer circumferential surface of follower drum 18 constructed and arranged as aforementioned. More specifically, drive roller 27 and pinch roller 28, mounted on shafts **27*b* and 28*b* respectively, are disposed on opposite sides of the tip 26*a* of magnetic head 26 in suitably spaced apart relationship. Peripheral grooves 27***a* and 28*a* are formed in the portions of the outer circumferential surfaces of two rollers 27 and 28 respectively which correspond to and are radially aligned with the gap 25 between upper and lower drum members 18*a* and 18*b*. Drive roller 27 is driven by suitable drive means.

In the magnetic recording and reproducing apparatus constructed as aforementioned, a magnetic tape 29 is caused to move along a portion of the outer circumferential surface of follower drum 18 corresponding to a circumferential extent on the order of an angle formed by drive roller 27 and pinch roller 28 with the center axis of shaft 22. When drive roller 27 is operated to move magnetic tape 29, the tape contacting the outer circumferential surface of roller drum 18 between rollers 27 and 28 travels at a rate equal to the peripheral velocity of follower drum 18. The portion of tape 29 between rollers 27 and 28 is maintained in intimate contact with a portion of the outer circumference of drum 18 radially inward pressure thereon exerted by drive roller 27 and pinch roller 28. Thus, magnetic tape 29 never moves in air during recording and reproduction, and hence no vibration of tape 29 occurs. Besides, since the magnetic tape 29 is maintained in contact with a portion of the outer circumferential surface of follower drum 18, the tape never expands or contracts. The follower drum 18 functions as a flywheel so that the wow flutter component of the tape transport system is eliminated. In addition magnetic tape 29 undergoes no change in tension because it is wound on the same object.

I claim:

1. Magnetic tape recording and reproducing apparatus comprising a follower drum mounted for rotation with a shaft and comprising two coaxial hollow cylindrical drum members, at least one magnetic head disposed in a gap between said two drum members and having a tip projecting outwardly from said gap, supporting means for rotatably supporting said shaft, a head supporter for supporting said magnetic head firmly secured to said supporting means and held against rotation relative thereto, and a drive roller and a pinch roller disposed on opposite sides of said tip of said magnetic head in suitably spaced apart relationship to press the tape against an outer circumferential surface of the follower drum and each formed with a peripheral groove in a portion thereof which corresponds to said gap between said two drum members.

2. Magnetic tape recording-reproducing apparatus including: a follower drum (18) comprising a pair of drum members (18*a*, 18*b*) axially spaced from each other along a common axis (22*a*) to form an axial gap (25), a magnetic head (25) positioned between the two drum members (18*a*, 18*b*) within said axial gap (25), means (22, 15, 15*a*, 16, 17, 20, 21) supporting the head (26) and the follower drum (18) for rotation of the follower drum (18) about said common axis (22*a*) with respect to the head (26), a first roller (27) and a second roller (28) and means (276, 286) supporting the rollers (27, 28) at opposite sides of the head (26) along the circumference of the follower drum (18), with the roller (27, 28) pressing tape portions against an outer circumferential surface of the follower drum, each roller formed with a circumferential groove (27*a*, 28*a*) in a portion thereof which corresponds to said axial gap between said two drum members, at least one of said first and second rollers being a drive roller.

3. Apparatus as in claim 2 wherein the magnetic head (26) is provided with a tip (26*a*) extending radially outwardly of the circumferential surface of the follower drum (18).

4. Apparatus as in claim 2 wherein the circumferential grooves (27*a*, 28*a*) of the rollers (27, 28) have an axial dimension greater than said axial gap (25) between the drum members (18*a*, 18*b*).

5. Apparatus as in claim 2 wherein the follower drum supporting means comprises a shaft (22) mounted for rotation within a co-axial sleeve (15), means (24) affixing one of the drum members (18*a*) to the shaft (22), means (15, 15*a*, 16, 17, 19) rotatably connecting the other drum member (18*b*) to said sleeve (15), and means for adjusting the axial separation between the drum members (18*a*, 18*b*) comprising means (15*c*, 23) for varying the relative axial position between the shaft (22) and the sleeve (15).

6. Apparatus as in claim 5 wherein the means for supporting the head (26) comprise a head supporter (20) connecting the head (26) to the coaxial sleeve (15).

7. Apparatus as in claim 6 including means for securing the head supporter (20) to the sleeve (15), comprising a threaded portion of the sleeve terminated at one axial end thereof in an offset portion (15*b*), means defining an opening in the head supporter for loosely receiving said threaded portion of the sleeve, and a nut (21) having threads engaging said threaded portion of the sleeve, with the head supporter being axially intermediate said land and said nut.

* * * * *